(12) United States Patent
Dong et al.

(10) Patent No.: US 12,306,950 B2
(45) Date of Patent: *May 20, 2025

(54) SECURE USER ASSIGNED DEVICE FROM MANUFACTURER

(71) Applicant: Microsoft Technology Licensing, LLC, Redmond, WA (US)

(72) Inventors: Anni Dong, Redmond, WA (US); Yanan Zhang, Bellevue, WA (US); Brian Stuard Perlman, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,725

(22) Filed: Aug. 22, 2023

(65) Prior Publication Data

US 2023/0401318 A1   Dec. 14, 2023

Related U.S. Application Data

(63) Continuation of application No. 16/912,270, filed on Jun. 25, 2020, now Pat. No. 11,775,647.

(51) Int. Cl.
*G06F 21/57* (2013.01)
*G06F 21/31* (2013.01)
*G06F 21/88* (2013.01)

(52) U.S. Cl.
CPC ............ *G06F 21/572* (2013.01); *G06F 21/31* (2013.01); *G06F 21/88* (2013.01); *G06F 2221/034* (2013.01)

(58) Field of Classification Search
CPC ........ G06F 21/572; G06F 21/31; G06F 21/88; G06F 2221/034; G06F 2221/2149;
(Continued)

(56) References Cited

U.S. PATENT DOCUMENTS 6,654,890 B1 * 11/2003 Girard .................... G06F 21/88
                                                             713/193
9,122,557 B1 * 9/2015 Swerdlow ................ G06F 8/71
(Continued)

OTHER PUBLICATIONS

Chen et al., "Hardware Protection via Logic Locking Test Points," IEEE Transactions on Computer-Aided Design of Integrated Circuits and Systems Year: 2018 | vol. 37, Issue: 12 | Journal Article | Publisher: IEEE.*

(Continued)

*Primary Examiner* — Roderick Tolentino
(74) *Attorney, Agent, or Firm* — Rainier Patents, P.S.

(57) ABSTRACT

This document relates to securing ownership of devices to particular users when the devices are shipped directly from an original equipment manufacturer in order to prevent malicious use of devices that are lost or stolen. A purchaser may purchase a device from an original equipment manufacturer, and as part of the purchasing process, may provide ownership information for the device, which may include a user identifier and an identity provider. The ownership data can be written to firmware, and upon powering on of the device, the device can request a user identifier, which is then validated by the identity provider before allowing operating systems operations to continue on the device.

20 Claims, 4 Drawing Sheets

(58) Field of Classification Search
CPC ...... H04L 2209/80; H04W 4/50; H04W 4/60; H04W 8/245
See application file for complete search history.

(56) References Cited

U.S. PATENT DOCUMENTS

| | | | | |
|---|---|---|---|---|
| 2006/0179132 A1* | 8/2006 | Babilon | .................... | G06F 8/63 709/222 |
| 2008/0250510 A1* | 10/2008 | Stevens | ............. | G08B 13/1409 726/35 |
| 2010/0216429 A1* | 8/2010 | Mahajan | ................. | G06F 21/88 455/410 |
| 2013/0326597 A1* | 12/2013 | Matsushita | ............ | G06Q 30/06 726/5 |
| 2013/0332718 A1* | 12/2013 | Dicker | ...................... | G06F 8/65 713/2 |
| 2015/0020189 A1* | 1/2015 | Soffer | ................ | H01R 13/6397 726/16 |
| 2015/0220742 A1* | 8/2015 | Ouyang | ................ | G06F 9/4406 713/189 |
| 2016/0085959 A1* | 3/2016 | Trika | .................... | H04L 9/0894 726/7 |
| 2016/0210547 A1* | 7/2016 | Dekeyser | ............... | G06K 7/065 |
| 2016/0241398 A1* | 8/2016 | Lewis | ................... | H04L 9/3231 |
| 2018/0012001 A1* | 1/2018 | Wallus | ................... | G06F 21/88 |
| 2019/0288845 A1 | 9/2019 | Wah | | |
| 2020/0228979 A1* | 7/2020 | Syed | .................... | H04W 12/12 |

OTHER PUBLICATIONS

Jin et al., "iGuard: A Real-Time Anti-Theft System for Smartphones," IEEE Transactions on Mobile Computing Year: 2018 | vol. 17, Issue: 10 | Journal Article | Publisher: IEEE.*
Communication pursuant to Article 94(3) EPC, Received for European Application No. 21724869.9, mailed on Feb. 5, 2024, 04 pages.

* cited by examiner

SECURE USER ASSIGNED DEVICE FROM MANUFACTURER

BACKGROUND

Typically, computing equipment that may be ordered from an original equipment manufacturer (OEM) can be configured according to the requirements of the ordering entity, and can then be deployed to an end point for use by a user. Such deployment can be, for example, to individual retail consumers, or to users that are associated with an organization. For example, with an increasing movement toward work-at-home programs, an IT administrator associated with the organization may order a specific device from the OEM and direct the device to be shipped directly to the organizational user at a home address. However, with the rise of package theft and/or packages lost during shipment, the device may fall into the hands of a malicious actor, which can present security risks to the organization. As such, there remain difficulties in deploying devices in a convenient manner.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1A:
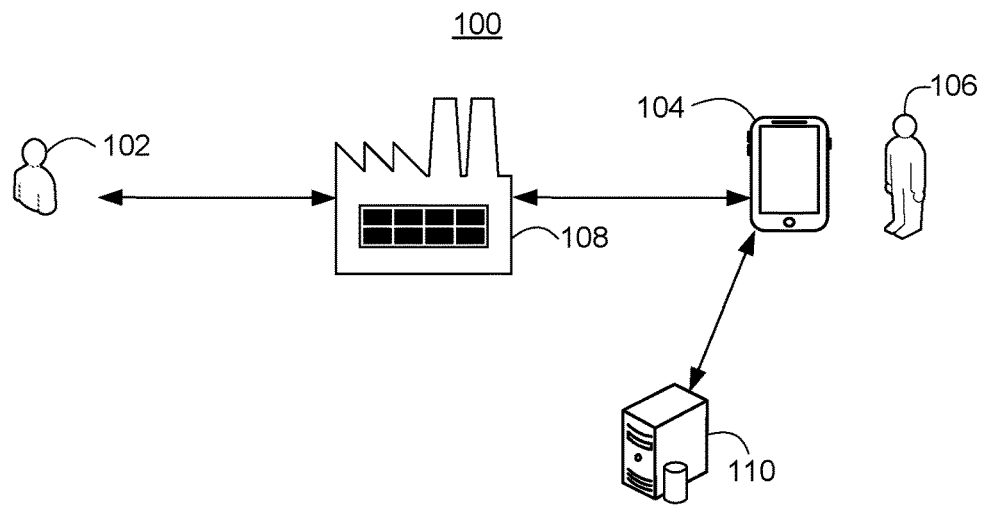
FIGS. 1A and 1B illustrate example environments that are consistent with some implementations of the present concepts.

With various organizations around the world adopting more flexibility in terms of work-at-home or teleworking, organizations are increasingly delivering equipment to a user at a location that is remote from the organization and/or the IT administrator associated with the organization. For example, when a new employee of an organization onboards, the employee may require a device such as a computer or mobile device to be shipped to the employee's location. Alternatively, an existing employee may require a replacement device, but would like to have the same configuration settings that exist on their current device.

In such instances, an IT administrator may take certain actions to ensure that a device can be provisioned with appropriate software, configuration settings, and/or policies that may be applicable to enable enrollment of the device into the organization's network. Such installation of software, configurations settings, and/or policies may be coordinated with the OEM via the use of, for example, an identifier associated with an identity and access management (IAM) service.

For example, the IT administrator may provide a tenant ID to an OEM upon placing an order for the device. The tenant ID may be an identifier that reflects the organization that the device may belong to, and the device can therefore be associated with the organization via the tenant ID upon manufacturing of the device. Then, when the device is shipped to the end point, the device can automatically contact the IAM service associated with the organization, and upon confirming the tenant ID associated with the device matches data stored within the IAM service, a configuration profile can be automatically downloaded and applied to the device. The configuration profile can therefore enable automatic provisioning of the device upon initial powering on of the device at the end point. Alternatively, in certain instances, an IT administrator can specify a default configuration profile that the OEM should utilize when manufacturing the device. The device can then be shipped to the end point, and upon receipt, the device can be powered on at the end point and automatically enrolled into the organization's network using the policies and settings specified in the default configuration profile.

However, when devices are deployed with information such as the provided tenant ID, the automated provisioning of such devices with applicable policies and settings upon powering on at the end point can result in a potential security risk, as shipments can often be misdelivered, stolen, or otherwise lost. In such an instance, the device may end up in the hands of a malicious actor, who can potentially gain access to the organization's network based at least on the automatic provisioning of policies and settings. To prevent such a security risk from arising, the device can be typically sent first to the organization or IT administrator, who can assign a specific user ownership to the device, such as a particular user account associated with the organization. Then, the device can be shipped to the user at the end point, for powering on and connection to the organization's network upon confirming that the end point user matches with the specific user ownership that is set for the device.

However, requiring that devices be first sent to the organization for assignment of a particular user as an owner of the device introduces inefficiencies, as the IT administrator for the organization cannot simply request that a device be issued straight from the OEM to the endpoint user. Thus, there may be a certain amount of downtime before the endpoint user may receive the device, as the device may require preconfiguring by the IT administrator in order to ensure that the device is locked to the particular endpoint user.

Additionally, while certain devices may have features that can "brick" the device when the device is stolen or lost, these devices often require an affirmative reporting of the device being lost to the manufacturer. Upon receipt of the report, the manufacturer may take an affirmative step to flag the identifier of the device as a stolen or lost device, which can cause the device to become unusable. However, requiring the manufacturer or IT administrator to take active steps to mark a device as stolen or lost means that the device can be potentially usable for a limited amount of time until the device is reported lost or stolen. This can lead to additional security risks for an organization or an individual, as a malicious actor could end up with access to an organization's network if an automated deployment profile is executed on the device.

As such, in certain implementations, devices can be deployed directly from an OEM to an end point, where information can be provided to the OEM during the ordering process such that the deployed device can be locked to a specific user and/or organization based on the information provided. For example, an IT administrator can provide information to the OEM that can lock the ordered device to an employee of the organization, such as a newly hired employee. The IT administrator can also specify an identity provider that can be contacted by the device upon initial powering on of the device in order to confirm the identity of the user at the end point.

The device can then be manufactured by the OEM, and utilizing the information provided during the ordering process, an ownership marker can be stored on the device. For example, in certain implementations, the ownership marker may include the user identity of the user that the device is assigned to and an identity provider that may be utilized to validate the user identity. Such an ownership marker may be permanently stored on the device, such as by burning the data values to the firmware of a device. Then, the device can be shipped directly to the newly hired employee without requiring additional involvement by the organization or the IT administrator to assign the device to the newly hired employee.

Upon receipt and powering on of the device, the device may access the firmware and determine that an ownership marker is present, which can indicate that validation of a user's identity may be required prior to performing any operating system operations associated with the device. For example, the device may restrict operating system (OS) operations until a user identity is provided that corresponds to the assigned user identity used to lock the device, and a validation ticket is received by the device. Thus, until the validation ticket is received, the device can be maintained in a "bricked" state where the device only accepts a user identity input, and other operating system operations are restricted. As such, even if a device is lost or stolen during transit, the device can be automatically maintained in an unusable state without requiring an IT administrator to take any proactive steps to mark the device as stolen or lost, thereby solving a technical solution of avoiding the potential security gap that can be caused by only disabling a device upon receiving a report that the device was lost or stolen.

Upon entry of the user identity, the device can validate the user identity via the identity provider, and upon receipt of a validation, such as a validation ticket, from the identity provider, the device can be removed from its "bricked" state and the lock on operating system operations can be removed upon validation of the received user input. Alternatively, in certain implementations, an override can be received from the organization that may manage the issuance of ownership markers with the OEM, in case there are complications with the identity provider that is specified in the ownership marker, such as where the identity provider goes offline.

To validate the user, the device may contact the specified identity provider, which can then require that the user authenticate with the specified identity provider. The identity provider can then check the identity information provided by the user, and validate the identity information by issuing a validation ticket back to the device. Once the validation ticket is received, the device can proceed with performing initial setup operations as may be defined by a configuration profile associated with the user or the device. Alternatively, the operating system may perform a default installation of configuration settings, which may be customized by the user during installation.

In one example use scenario, an IT administrator may desire to provide a device to a new employee at an end point, such as the home of the new employee. The IT administrator may issue a purchase order to purchase the device that is intended to be deployed from an OEM or a reseller associated with the OEM, which for purposes of this patent will be referred to collectively as an OEM. As part of the purchasing process, the IT administrator may enter ownership data that can be associated with the device in order to secure the device to a user represented by the ownership data. In one implementation, the ownership data may be a user identifier, such as an email address. The ownership data can also specify an identity provider that can be used to validate that a response received from the user at the end point corresponds to the provided user identifier established upon ordering of the device.

In certain implementations, the identity providers that may be utilized for validation of the user identity can be selected from a list of trusted identity providers. For example, when purchasing the device from the OEM, a user may attempt to enter a third-party website as the identity provider that can be used to validate the identity of the user. However, the OEM may compare the received data to a listing of trustworthy identity providers, and if the identity provider that is submitted is not included in the listing of trustworthy identity providers, the OEM may flag the provided data as invalid.

In another implementation, the user identity that may be associated with the device may be any type of identifier that can be used to uniquely identify a particular user. As noted earlier, such a user identifier may be an email address associated with the user. However, it is to be appreciated that other types of identifiers can be used. For example, the user identifier may be a passcode phrase that can be received from the user upon delivery of the device, where the passcode phrase can be validated against an IAM service or a database that associates the passcode phrase with the particular device. Alternatively, the user identifier can be biometric data associated with the user, such as a facial scan, a retina scan, and/or a fingerprint. In certain implementations, the device may receive two forms of user identifiers, such that if a biometric identifier is unavailable (e.g., a user's fingerprint is unreadable due to an object covering the user's fingerprint), a backup user identifier can be used, such as an email address.

Upon processing the purchase, the OEM may generate a purchase order ID regarding the purchase, and ship the purchased device directly to the desired end point. Based on the purchased device, the OEM can generate a computer build report (CBR) containing device specifications associated with the purchased device. Such device specifications may include a number of different types of data associated with the device, such as the OEM name who built the device, a device model name, a device serial number, and/or a device 4K hardware hash. The device 4K hardware hash can be a hash value that may contain several details about the device, including its manufacturer, model, device serial number, hard drive serial number, BIOS identifier, and many other attributes that can be used to uniquely identify that device in a single hash value. However, while the 4k hardware hash can be used to identify the device, a tuple of information can also be used to identify the device. In some implementations, the tuple may consist of the OEM name, the device model name, and the device serial number, which can be used to uniquely identify a device.

The CBR may also include information indicative of the ownership marker that has been applied to the device, such as an encrypted BIOS flag as to whether the device may require forced validation of the ownership claim, and an encrypted OS hash value that may represent the status of a configuration of the device. For example, the BIOS flag may be set on the manufacturer device to indicate that the device should disable any provisioning or customization steps on the client until validation of the user identity has been performed. Thus, the CBR may include information as to whether the device is enforcing the BIOS flag.

In certain implementations, the CBR can be directly uploaded by the OEM to the IAM service associated with the organization, thereby automatically registering the purchased device in the managed network associated with the organization. For example, the IT administrator may issue a purchase order for a new device, and can then provide a particular IAM service identifier to the OEM. In some implementations, the IAM server identifier may be a tenant ID, which can be used to identify a particular tenant of a directory service, such as Microsoft Azure Active Directory, or Amazon Web Services Identity and Access Management, among other identity management software. The OEM can then upload the CBR to the IAM service associated with the tenant ID, and the purchased device can automatically be associated with the purchasing organization for inclusion in the managed network.

Furthermore, by uploading the CBR to the IAM service, various data in the CBR can be utilized to ensure that the manufactured device remains in its original state, both in terms of hardware and software. For example, the 4k hardware hash can be utilized to ensure that the BIOS has not been modified from the BIOS that was originally present when the device was manufactured. For example, if the device were stolen or lost during shipment, a malicious actor could attempt to reflash the existing BIOS in order to circumvent the BIOS flag. The malicious actor could then attempt to gain access to an organization's managed network by way of the deployment profile that may be loaded onto the device. However, in this instance, the IAM service may access the CBR to determine whether the existing device configuration matches with the CBR. For example, the IAM service can determine whether hardware or software settings have changed for the device by comparing the 4k hardware hash to the information received from the device. If the comparison determines that the information does not match, the IAM service can flag the device as being a potential security risk.

The deployment profiles may specify certain configuration settings for setting up the devices upon powering on at the end point, once the user identity has been validated. For example, the deployment profile may specify mobile device management policy settings, default languages, keyboard settings, personal assistant settings (such as the use of Microsoft Cortana or Google Assistant), along with specific device management policies that can be enforced on the device. The configuration profile can then be associated with the devices (e.g., in the instance that all devices should be configured exactly the same), or certain configuration profiles may be uniquely associated with a particular device, such as by use of a particular device identifier. The deployment profile can then be stored on the management service for access by the device upon powering on of the device, following validation.

As a result of the configuration profiles being created and stored in the cloud, an end user can receive the device as provided by either the OEM or the organization in charge of the managed network, and simply can power on the device and ensure that network access is available (e.g., such as by connecting an Ethernet cable to the device). Upon powering on, the device may determine whether the BIOS flag is set to enforce identity verification, and can then prompt the user for a user identifier if the BIOS flag is set. The device can then validate the user identifier against an identity provider specified in the BIOS, and upon validation of the user, a deployment profile for the device may be accessed and the device can apply the deployment profile to begin automated configuration of the device. Furthermore, during configuration of the device, customized information can be displayed based on the configuration profile, such as a splash screen depicting the name of the organization, along with current installation and configuration statuses.

In another example use case scenario, individual customers that may not be associated with an organization may utilize the disclosed implementations to securely lock a device to the customer during the purchasing experience with the OEM. For example, a parent may wish to purchase a new laptop for a child who is currently away at college. Because the laptop may be shipped directly to the child, the parent may wish to lock the laptop to an identity associated with the child in order to prevent the laptop from being used if it is lost or stolen during shipment. Therefore, as part of the purchasing process, the parent may enter a user identifier associated with the child, such as an email address, along with an identity provider that can validate whether an obtained input, such as an obtained user identifier received upon powering on of the device, matches the user identifier that is stored as part of the ownership marker.

For example, once the laptop is shipped to the child, the child may power on the laptop, and be presented with a challenge from the identity provider to supply a user identity. As the parent is aware that the child utilizes a commercial email provider and has an associated email address with that provider, the parent may provide that commercial email provider as the identity provider when ordering the laptop from the OEM. In certain implementations, the identity provider may be a commercial email provider such as Microsoft Hotmail, Google Gmail, or Yahoo! Mail, which may expose an API allowing identity verification to be performed utilizing the commercial service. Alternatively, the identity provider may be an email system associated with the college network, which may be managed by an IAM service.

When purchasing the device from the OEM, certain customizability settings can also be specified that may provide automatic configuration of the device upon validation of the user identity. Referring again to the example of the parent shipping a laptop to a child at college, the parent may order the laptop and provider ownership information regarding the laptop to the OEM. The parent may also provide certain customization settings that should be associated with the laptop upon validation of the user identity, such as having the operating system configure a default desktop background that depicts a photo of the child's family with a congratulatory message on heading to college. Such configuration settings can be automatically applied upon validation of the user identity, such as by automatically downloading a deployment profile associated with the device upon user validation. Alternatively, in certain implementations, the OEM can automatically apply a deployment profile containing the particular customization settings to the device, and can then lock the device to the customer such that the device can only be accessible if the user identifier provided upon powering on of the device matches the information provided by the customer.

Thus, the implementations disclosed herein provide for a method of locking ownership of a device to a particular user at the point of manufacture of the device, and the device can then be shipped directly from the OEM to the particular user. Upon validation of the user by an identity provider, an automated configuration process can then be performed according to a deployment profile that may be stored on an IAM service, such that the device can be setup and configured in a fully automated manner without requiring any additional intervention by the user, as the device can perform any necessary setup procedures according to the deployment profile or configuration profile that may be stored locally on the device or in the cloud. The locking of ownership of the device can therefore prevent the malicious use of the device if the device is lost or stolen during shipment.

Figure 1B:
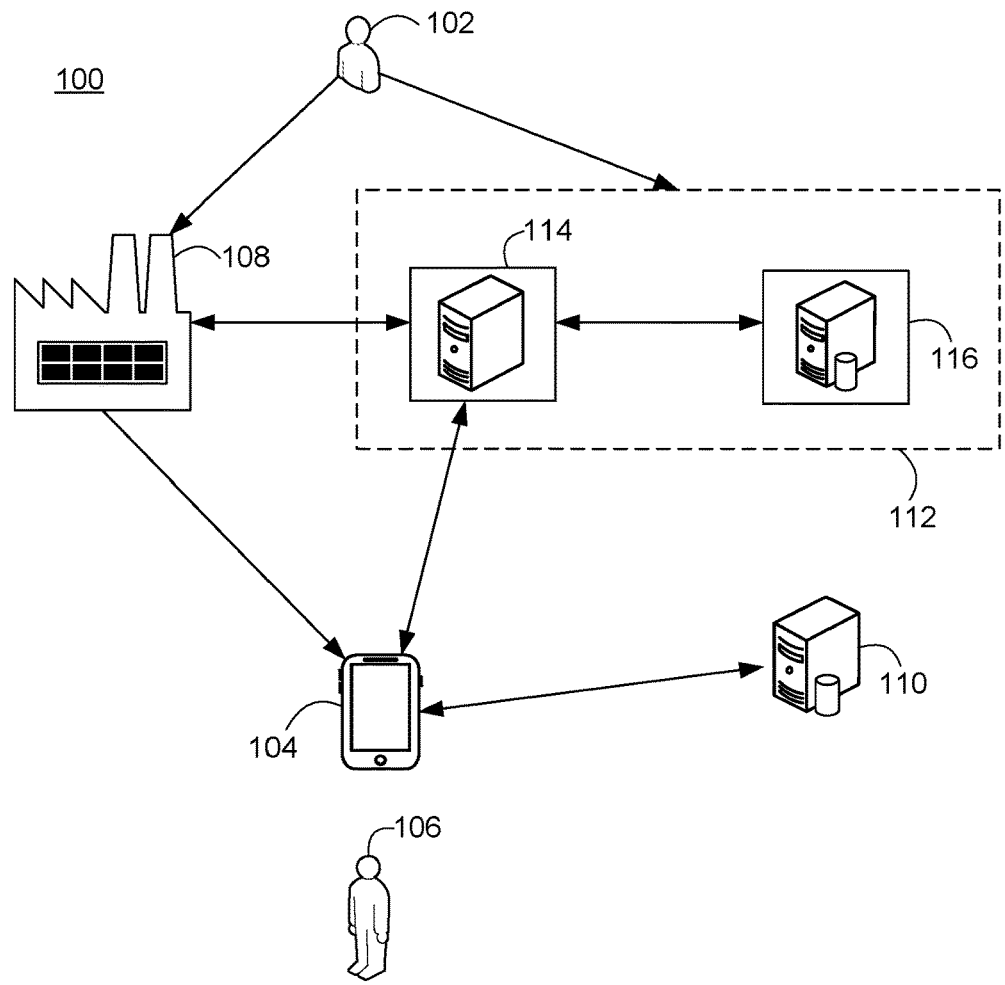

FIGS. 1A and 1B depict implementations of an example environment 100 for securing devices to a particular user as part of the device purchasing process. Specifically, FIG. 1A depicts an implementation of environment 100 where a device can be purchased from an OEM by a customer who may not be associated with an organization (i.e., not an IT administrator), and the device can be shipped to an end point user (e.g., a parent shipping the device to a college student). As depicted in FIG. 1A, a purchaser 102 may wish to deploy a device 104 for use by a user 106 at an end point. Purchaser 102 may interact with an OEM 108 such that a device order can be placed for delivery to user 106. In certain implementations, purchaser 102 may order the device by interacting with an online store provided by OEM 108.

As part of the ordering process, purchaser 102 may provide ownership data to the OEM 108, where the ownership data can be utilized to lock the device to user 106. In certain implementations, the ownership data may include a user identifier and an identity provider that can be contacted to validate an identity provided by user 106 upon powering on of device 104. The device can access an identity provider 110 in order to validate that the user identifier provided by user 106 matches the user identifier associated with the ownership data.

Purchaser 102 can also create a configuration profile that may be associated with device 104, which can be used to automatically configure device 104 with certain customization settings without requiring interaction by user 106 once the user identity of user 106 is validated. The configuration profile can be included with device 104, such that upon validation of the user identity, the customization settings are automatically applied. For example, assuming the device is sent to a new college student, the customization settings may apply a desktop background and screensaver that depicts a mascot of the college where the student is enrolled. Device 104 can then be shipped directly to user 106 at the end point.

FIG. 1B depicts an alternate implementation of example environment 100, where purchaser 102 may be an IT administrator associated with an organization. Similar to FIG. 1A, purchaser 102 may submit an order to OEM 108 for a device 104 to be delivered to user 106. However, it is to be appreciated that purchaser 102 may upload purchase order forms to OEM 108 for purchasing a large number of devices, such as where an IT administrator may need to deliver several devices to different users throughout the organization. The purchase order forms may include the ownership data for each device ordered from the OEM.

Additionally, purchaser 102 may wish to have a common profile associated with each of the devices, and therefore may also create a deployment profile to be used by the OEM in producing the various devices. Alternatively, a majority of the devices may utilize the deployment profile, while certain devices may also utilize a configuration profile that can be applied to the device after the deployment profile is applied. For example, certain devices that may be utilized by an IT professional within an organization may require greater access to an operating system's command-line interpreter, whereas such access may be restricted on a typical employee's device. As such, a particularized configuration profile can also be associated with devices that are to be owned by an IT professional within the organization.

The deployment or configuration profiles may be stored in a cloud-based management service 112, which may be an enterprise mobility management service such as Microsoft Intune or AWS Marketplace, among other enterprise mobility management services. Upon powering on and connection of device 104 to a network, such as the Internet, device 104 may perform ownership validation utilizing identity provider 110, and upon successful validation of user 106, a particular deployment profile for the device can be downloaded from management service 112, and the profile may automatically configure the device for use by user 106.

Once the deployment profile is downloaded, the various settings associated with device 104 can be applied. Furthermore, user 106 may see an organization-specific introduction screen displayed on a display of the device, which may provide information on the current device management process and otherwise lock the user out from making alternative changes to the device setup. Additionally, in instances where device 104 is to have specialized configurations settings beyond the deployment profile, a configuration profile can be applied to the device in order to provide the specialized configurations.

Management service 112 may include one or more databases and/or directories that can be used for managing device configurations. For example, management service 112 may include a Device Directory Services (DDS) database 114, and an IAM service 116. In one implementation, purchaser 102 may provide ownership data to OEM 108, which in turn may upload the device ownership data and the CBR to DDS database 114.

DDS database 114 may then interact with an IAM service 116. In some implementations, IAM service 116 may be a Azure Active Directory, or Amazon Web Services Identity and Access Management, among other identity management software. DDS database 114 may create a record in the IAM service 116, which may include a durable device ID (DDID) that can be utilized to reference the recorded device as defined in the CBR. The DDID can be utilized when the device validated in order to locate the deployment profile associated with the device.

It is to be appreciated that while FIG. 1B depicts identity provider 110 as separate from IAM service 116, in certain implementations, IAM service 116 may also serve as identity provider 110. However, as purchaser 102 can specify any identity provider from a list of approved identity providers, there may be instances where it may be preferable to use a commercial email provider, such as Hotmail, for the initial validation of device 104. Then, upon validation of the device, IAM service 116 can be utilized to ensure that device 104 can be appropriately joined to any managed networks associated with an organization.

Figure 2:
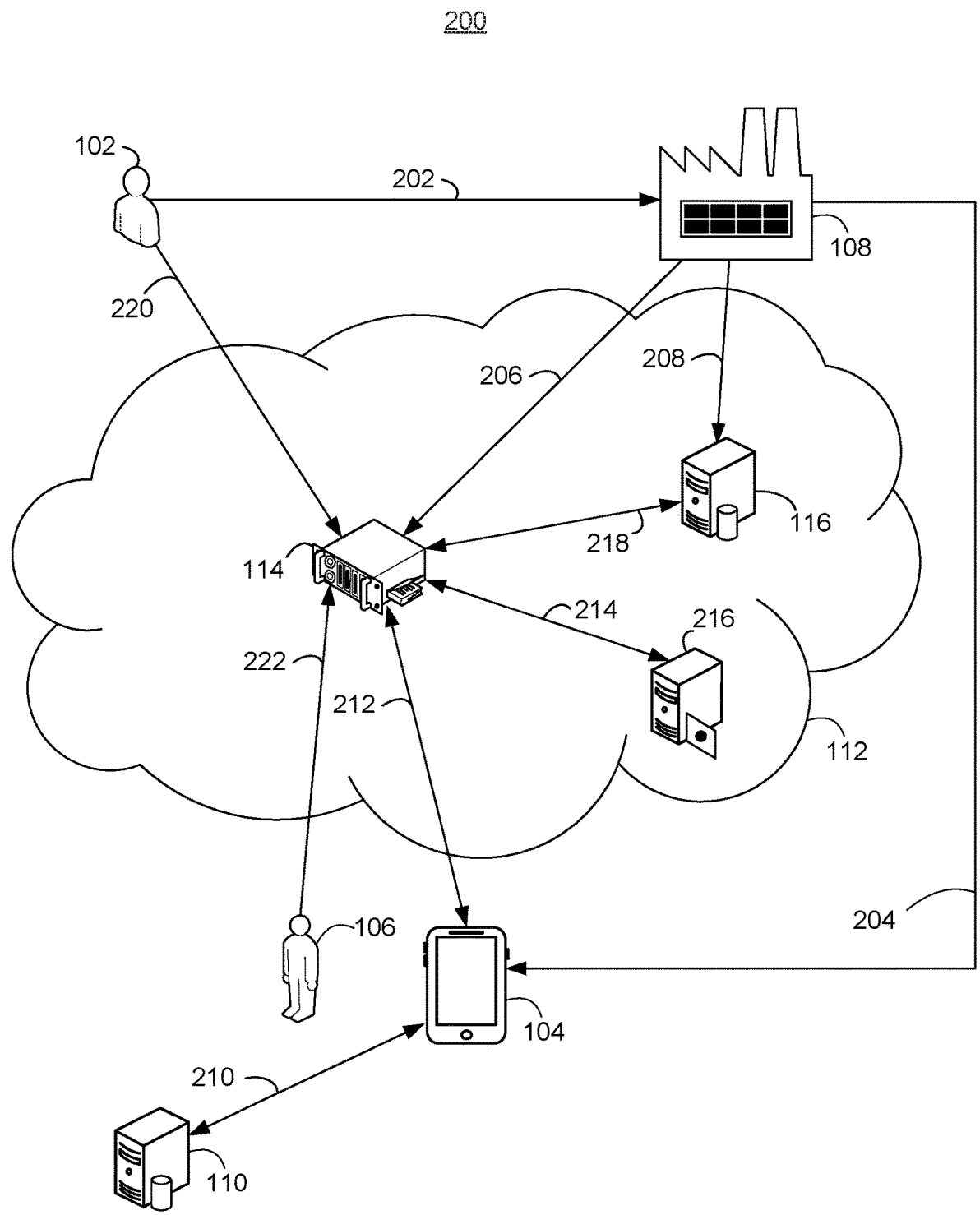
FIG. 2 illustrates an example process flow that is consistent with some implementations of the present concepts.

FIG. 2 depicts a process 200 for securing a device to a particular user, when the device is planned to be integrated into an organization's network. At step 202, purchaser 102 may interact with OEM 108 to purchase a device by accessing, for example, a portal associated with the OEM. The portal can be a web-based storefront associated with the OEM, or may be a purchase order driven site where an IT administrator may upload purchase orders for devices that are to be deployed for an organization. Utilizing the portal, the customer can configure the device as necessary, and can also provide user ownership data that can be used to verify an identity of a user upon receipt of the device. For example, the user ownership data may include a particular user identifier, along with an identity provider that can validate the user identifier.

The OEM can then utilize the provided information to write an ownership marker to a secure portion of the firmware of the device. For example, in certain implementations, the ownership marker may be written to a Unified Extensible Firmware Interface (UEFI) Basic Input-Output System (BIOS) upon initial manufacturing of the device. Furthermore, a BIOS flag can be set at the manufacturing level to indicate that ownership validation should occur prior to allowing any OS operations to proceed. Thus, based on the writing of the ownership marker to the firmware, the device can be automatically placed into an unusable state until validation of a user identity occurs.

At step 204, OEM 108 may ship device 104 to user 106. Furthermore, at step 206, OEM 108 can provide machine identity information to DDS database 114 so that the DDS database has a record of devices that have been provided to customers. At step 208, OEM 108 can additionally upload a CBR that corresponds to the deployed device to IAM service 116, which may record the various CBR data for all products produced by the OEM that are to be associated with the organization's network. The CBR data can include various build information associated with the device, along with an encrypted BIOS flag, and an encrypted OS hash, which can be used to compare against when the device is powered on in order to confirm that the state of the BIOS and OS on the device has not been tampered with since the device was shipped to the end point.

Upon receipt of device 104 by user 106, the user may power on the device, and the device may determine that a BIOS flag is set that may require the device to validate ownership of the device. As such, device 104 may access the ownership marker associated with the firmware to determine the identity provider that was burned into the firmware. At step 210, the device may communicate with identity provider 110 in order to present an identity verification prompt to user 106. Once user 106 submits a user identity, the user identity is validated at identity provider 110, which can return a validation ticket to device 104 indicating that the user was validated.

Upon confirming that the identity of user 106 matches the user identity associated with the ownership marker, device 104 can continue with configuration of the device. In certain implementations, at step 212, the device may request enrollment in the organization's managed network by providing its DDID to DDS database 114. DDS database 114 may determine an appropriate deployment profile and, in step 214, may interact with an account repository 216 to receive appropriate account information for use with management service 112. Moreover, at step 218, DDS database 114 may interact with IAM service 116 to verify that the ownership marker associated with device 104 matches the information contained in the CBR that was received from OEM 108. Specifically, at step 218, DDS database 114 may confirm that the 4k hardware hash and the encrypted OS hash associated with device 104 match with the hash values associated with the stored CBR records for the device. Finally, upon determining that the attestation process was successful, DDS database 114 can provide a deployment profile to device 104, which can automatically configure device 104 without additional user involvement.

Finally, there may be instances where a device may be gifted to another individual or sold to a third party after shipment of the device to user 106. In such instances, the device may be formatted to return the device to its factory state, but as a result, the device may continue to assume that the BIOS flag is set, and that the ownership of the device remains with user 106. In such an instance, DDS database 114 can be updated with information indicating that the device lock can be released. In certain implementations, the ownership marker may remain in the firmware of the device, and an additional marker can be provided in the firmware that can indicate that the ownership marker does not need to be enforced as the user is no longer an owner of the device. Such a process for adding the additional marker can be according to instruction provided by purchaser 102 (e.g., an IT administrator) at step 220, or may be initiated by user 106 at step 222.

Example System

Figure 3:
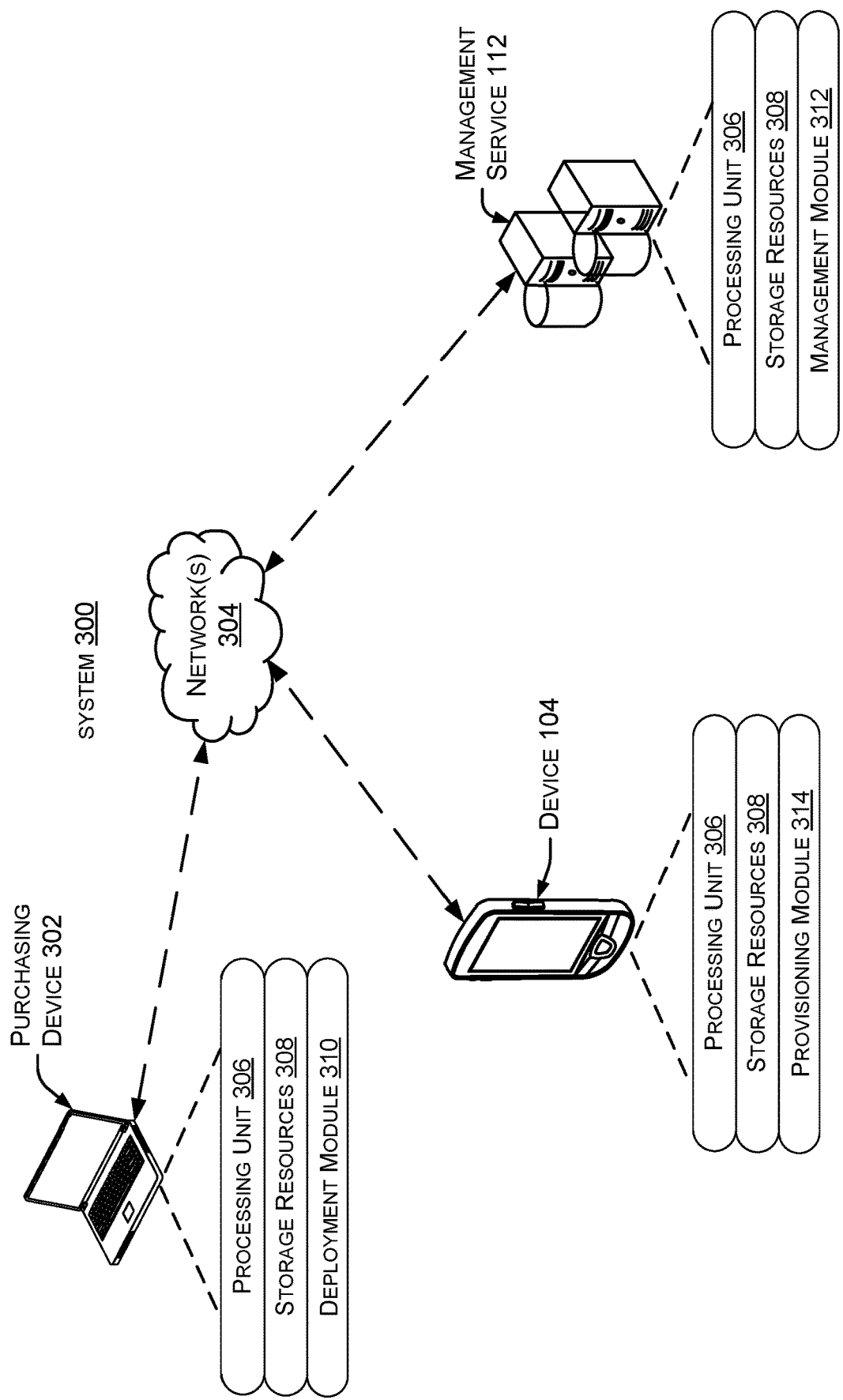
FIG. 3 illustrates an example system that is consistent with some implementations of the present concepts.

The present implementations can be performed in various scenarios on various devices. FIG. 3 shows an example system 300 in which the present implementations can be employed, as discussed more below.

As shown in FIG. 3, system 300 can include a purchasing device 302, management service 112, and one or more devices 104 that are for deployment. Each of the above devices may be connected by one or more network(s) 304, which may be a LAN, WAN, or any other such type of network. Note that either purchasing device 302 and/or device 104 can be embodied both as mobile devices such as smart phones or tablets, as well as stationary devices such as desktops, server devices, stand-alone kiosks, etc. Likewise, management service 112 can be implemented using various types of computing devices. In some cases, any of the devices shown in FIG. 3, but particularly the servers, can be implemented in data centers, server farms, etc.

Generally, devices 104, management service 112, and purchasing device 302 may have respective processing units 306 and storage resources 308, which are discussed in more detail below. The devices may also have various modules that function using the processing units and storage resources to perform the techniques discussed herein. The storage resources can include both persistent storage resources, such as read-only memory, and magnetic or solid-state drives, and volatile storage, such as one or more random-access memory devices. In some cases, the modules are provided as executable instructions that are stored on persistent storage devices, loaded into the random-access memory devices, and read from the random-access memory by the processing units for execution. In other instances, the modules can be provided as executable instructions that are stored permanently into persistent storage, such as read-only memory.

Purchasing device 302 can be utilized by, for example, purchaser 102 to purchase devices for deployment, and to create deployment profiles utilizing a deployment module 310 that can interact with a management module 312 on management service 112. Generally speaking, the deployment module can provide certain configuration parameters to the management modules, and may associate certain deployment profiles with particular device IDs and/or user identifiers that reflect ownership of devices, which can be used in provisioning the devices upon initial powering on of the devices. The configuration parameters can include system configuration settings, as well as policy restrictions and requirements that may be controlled according to management module 312.

Management module 312 can further be used in validating identity of a user associated with device 104, and further attesting information that is received from device 104, such as by attesting that certain hash values associated with the BIOS or other hardware corresponds to recorded information that may be associated with device 104. Management module 312 can then confirm enrollment of device 104 and provide the specific deployment profile that is to be associated with the device. The deployment profile can then be utilized by a provisioning module 314 that may operate on device 104, which can provision the shared device according to the instructions provided in the deployment profile.

Device Implementations

As noted with respect to FIG. 3, system 300 may include several components and/or devices, including device 104, management service 112, and purchasing device 302. However, not all device implementations can be illustrated, and other device implementations should be apparent to the skilled artisan from the description above and below.

The term "device", "computer," "computing device," "client device," "service," "server," and or "server device" as possibly used herein can mean any type of device that has some amount of hardware processing capability and/or hardware storage/memory capability. Processing capability can be provided by one or more hardware processor units (e.g., hardware processing units/cores) that can execute computer-readable instructions to provide functionality. Computer-readable instructions and/or data can be stored on persistent storage or volatile memory. The terms "service" and/or "system" as used herein can refer to a single device, multiple devices, etc.

Storage resources can be internal or external to any respective devices with which it is associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as ROM, hard drives, optical discs, and flash memory, among others, which may entail the storage resources.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Example Secure User Ownership Method

Figure 4:
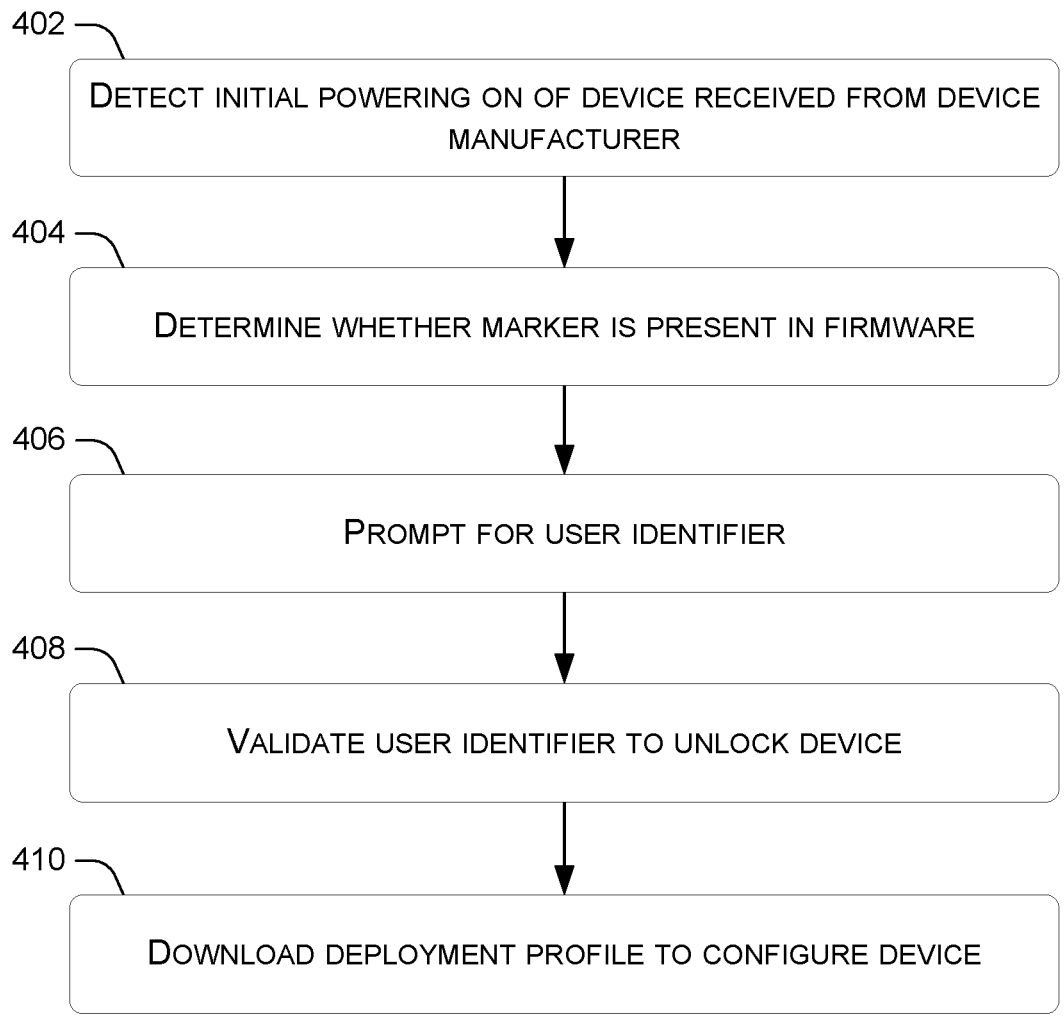
FIG. 4 illustrates an example method or technique that is consistent with some implementations of the present concepts.

The following discussion presents an overview of the secure user ownership functionality described above. FIG. 4 illustrates an example method 400, consistent with the present concepts.

At block 402, the device may detect an initial powering on of the device that has been received from a device manufacturer. In certain implementations, the device manufacturer may be an OEM, and the device may be delivered to the end point based on a purchase order that was received by the OEM directing the OEM to ship the device to the end point. Then, once it is received at the end point, the device may be initially powered on in order to configure the device for use.

At block 404, the device may determine whether an ownership marker is present in firmware of the device. For example, upon initial powering on of the device, the device may determine that a BIOS flag is present that directs the device to lock operating system operations until a user identifier is received that can be validated against ownership data stored in the firmware.

At block 406, the device can prompt a user for a user identifier, which can then be validated in order to unlock the device at block 408. For example, the user may enter an email address that is utilized as a user identifier, and the email address can be validated against an identity provider that may be a commercial email provider.

Finally, at block 410, upon validation of the user identifier, the device can be unlocked and a deployment profile can be downloaded and the device may utilize the deployment profile to automatically configure the device according to the settings provided in the deployment profile. In certain implementations, the device can perform the configuration without requiring any involvement by a user of the device, as the deployment profile may specify organizational data associated with the organization that created the deployment profile, along with default settings that can fully configure the device for use by the user.

Various examples are described above. Additional examples are described below. One example includes a device comprising a hardware processing unit and a storage resource storing computer-readable instructions that, when executed by the hardware processing unit, cause the hardware processing unit to: detect an initial powering on of the device, determine whether an ownership marker is present on the device, lock the device from performing operating system operations upon determining that the ownership marker is present, obtain an input of a user identifier to unlock the device, and unlocking the device for further operating system operations upon receiving a validation that the obtained input matches a user identifier associated with the ownership marker.

Another example can include any of the above and/or below examples where the device comprises computer-readable instructions that, when executed by the hardware processing unit, further cause the hardware processing unit to download, from a database, a deployment profile containing configuration settings for the device when the obtained input of the user identifier matches a user identifier associated with the ownership marker.

Another example can include any of the above and/or below examples where the device comprises computer-readable instructions that, when executed by the hardware processing unit, further cause the hardware processing unit to automatically configure the device according to the configuration settings without requiring a user of the device to enter any configuration settings.

Another example can include any of the above and/or below examples where the deployment profile is created by an administrator associated with an organization.

Another example can include any of the above and/or below examples where the deployment profile defines mobile device management policy settings to be applied to the device.

Another example can include any of the above and/or below examples where the device is shipped directly to a user by an original equipment manufacturer.

Another example can include any of the above and/or below examples where the ownership marker is written to firmware of the device by the original equipment manufacturer.

Another example can include any of the above and/or below examples where the ownership marker includes a user identity corresponding to a user indicated as owner of the device and an identity provider that can perform validation of the obtained input of the user identifier.

Another example can include any of the above and/or below examples where the device is ordered by a purchaser that is different from the user indicated as the owner of the device.

Another example can include any of the above and/or below examples where the purchaser provides the user identity and the identity provider to the original equipment manufacturer during purchasing of the device.

Another example can include any of the above and/or below examples where the purchaser specifies that the ownership marker should not be enforced by adding an additional marker to the firmware.

Another example includes a method for locking a device to a user comprising detecting an initial powering on of the device, the device having been received from a device manufacturer, determining whether a marker is present in firmware of the device that reflects that the device is locked to the user, prompting for a user identifier upon determining that the marker is present, and validating the user identifier in order to unlock the device.

Another example can include any of the above and/or below examples where the method further comprises downloading a deployment profile containing configuration settings for the device upon validating the user identifier.

Another example can include any of the above and/or below examples where the marker is written to the firmware of the device by the device manufacturer.

Another example can include any of the above and/or below examples where the device is ordered from the device manufacturer by a purchaser that is different from the user associated with the user identifier.

Another example can include any of the above and/or below examples where the purchaser specifies that the marker should not be enforced by adding an additional marker to the firmware upon determining that the user is no longer an owner of the device.

Another example includes a system comprising a hardware processing unit and a storage resource storing computer-readable instructions that, when executed by the hardware processing unit, cause the hardware processing unit to: determine that a BIOS flag is present for enforcing a lock on operating system operations, receive a user identifier responsive to determining that the BIOS flag is present, and validate the received user identifier using an identity provider stored in firmware, where the lock on operating system operations is removed upon validation of the received user identifier.

Another example can include any of the above and/or below examples where the received user identifier is validated when the received user identifier matches ownership data stored in the firmware.

Another example can include any of the above and/or below examples where the identity provider is associated with the ownership data.

Another example can include any of the above and/or below examples where the ownership data is stored in the firmware by an original equipment manufacturer.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
a hardware processing unit; and
a storage resource storing computer-readable instructions which, when executed by the hardware processing unit, cause the system to:
obtain ownership data relating to an owner of a device;
cause an ownership marker to be written to storage on the device prior to shipment of the device to the owner, the ownership marker being based on the ownership data relating to the owner of the device;
associate the ownership data with a deployment profile having configuration settings for the device; and
send the deployment profile to a database;
wherein the device is configured to, upon initial powering on of the device:
determine that the ownership marker is present on the storage of the device,
lock the device from performing a particular operating system operation until validation is received that an obtained input matches a user identifier associated with the ownership marker, and responsive to receiving the validation, retrieve the deployment profile from the database and apply the configuration settings to the device.

2. The system of claim 1, wherein the computer-readable instructions, when executed, cause the system to:
send the ownership data to a manufacturer of the device, wherein sending the ownership data to the manufacturer causes the manufacturer to write the ownership marker to the storage on the device.

3. The system of claim 2, wherein the ownership data is sent to the manufacturer prior to the device being manufactured.

4. The system of claim 1, wherein the deployment profile defines mobile device management policy settings that are applied after being accessed by the device.

5. The system of claim 1, wherein the ownership marker includes a user identity corresponding to the owner of the device.

6. The system of claim 1, wherein the ownership marker indicates an identity provider that can perform validation of the obtained input.

7. A method comprising:
obtaining ownership data relating to an owner of a device;
causing an ownership marker to be written to a storage resource of the device prior to shipment of the device to the owner, the ownership marker being based on the ownership data relating to the owner of the device;
associating the ownership data with a deployment profile having configuration settings for the device; and
sending the deployment profile to a database;
wherein the device is configured to, upon initial powering on of the device:
determine that the ownership marker is present,
lock the device from performing a particular operating system operation until validation is received that an obtained input matches a user identifier associated with the ownership marker, and
responsive to receiving the validation, retrieve the deployment profile from the database and apply the configuration settings to the device.

8. The method of claim 7, wherein the ownership marker includes an email address of the owner of the device.

9. The method of claim 7, wherein the ownership marker includes a passcode phrase of the owner of the device.

10. The method of claim 7 wherein the ownership marker includes biometric data of the owner of the device.

11. The method of claim 7, wherein the ownership marker is caused to be written to firmware of the device.

12. The method of claim 11, wherein the causing of the ownership marker to be written to the firmware is performed prior to shipment of the device to the owner.

13. A hardware computer-readable storage medium storing computer-readable instructions which, when executed by a hardware processing unit, cause the hardware processing unit to perform acts comprising: obtaining ownership data relating to an owner of a device; causing an ownership marker to be written to storage of the device prior to shipment of the device to the owner, the ownership marker being based on the ownership data relating to the owner of the device;
associating the ownership data with a deployment profile having configuration settings for the device; and
sending the deployment profile to a database, wherein the device is configured to, upon initial powering on of the device:
determine that the ownership marker is present on the storage of the device, lock the device from performing a particular operating system operation until validation is received that an obtained input matches a user identifier associated with the ownership marker, and
responsive to receiving the validation, retrieve the deployment profile from the database and apply the configuration settings to the device.

14. The hardware computer-readable storage medium of claim 13, the initial powering on being the first time the device is powered on after delivery of the device from a manufacturer of the device to an end user.

15. The hardware computer-readable storage medium of claim 13, wherein the configuration settings specify a default language for the device.

16. The hardware computer-readable storage medium of claim 13, wherein the configuration settings specify a keyboard setting for the device.

17. The hardware computer-readable storage medium of claim 13, wherein the configuration settings specify a personal assistant to be implemented by the device.

18. The hardware computer-readable storage medium of claim 13, wherein the deployment profile specifies a particular image that the device employs as a default desktop background responsive to receiving the validation.

19. The hardware computer-readable storage medium of claim 13, wherein the deployment profile specifies a particular image that the device employs as a default screen saver responsive to receiving the validation.

20. The hardware computer-readable storage medium of claim 13, wherein the causing the ownership marker to be written to the storage of the device comprises accessing a portal associated with a manufacturer of the device and providing the ownership data to the manufacturer via the portal, wherein the manufacturer writes the ownership marker to the storage of the device when manufacturing the device.

* * * * *